United States Patent
Ryu et al.

(10) Patent No.: US 9,407,344 B2
(45) Date of Patent: Aug. 2, 2016

(54) METHOD FOR TRANSMITTING A DOWNLINK SIGNAL IN A BASE STATION COOPERATIVE WIRELESS COMMUNICATION SYSTEM AND AN APPARATUS FOR SAME

(75) Inventors: Jongyeol Ryu, Daejeon (KR); Wan Choi, Seoul (KR); Dongin Kim, Seongnam-si (KR); Hanbyul Seo, Anyang-si (KR)

(73) Assignees: LG ELECTRONICS INC., Seoul (KR); RESEARCH & BUSINESS FOUNDATION SUNGKYUNKWAN UNIVERSITY, Suwon-si, Gyeonggi-do (KR)

( * ) Notice: Subject to any disclaimer, the term of this patent is extended or adjusted under 35 U.S.C. 154(b) by 102 days.

(21) Appl. No.: 14/350,341

(22) PCT Filed: Jul. 9, 2012

(86) PCT No.: PCT/KR2012/005414
§ 371 (c)(1),
(2), (4) Date: Apr. 7, 2014

(87) PCT Pub. No.: WO2013/058468
PCT Pub. Date: Apr. 25, 2013

(65) Prior Publication Data
US 2014/0254532 A1    Sep. 11, 2014

Related U.S. Application Data

(60) Provisional application No. 61/547,740, filed on Oct. 16, 2011.

(51) Int. Cl.
*H04B 7/04* (2006.01)
*H04W 72/04* (2009.01)
(Continued)

(52) U.S. Cl.
CPC .............. *H04B 7/0456* (2013.01); *H04B 7/024* (2013.01); *H04L 5/0035* (2013.01); *H04L 25/03891* (2013.01); *H04W 72/04* (2013.01); *H04B 7/0417* (2013.01); *H04B 7/0626* (2013.01)

(58) Field of Classification Search
None
See application file for complete search history.

(56) References Cited

U.S. PATENT DOCUMENTS

2010/0298006 A1* 11/2010 Ko .................. H04B 7/022
455/452.2
2011/0009125 A1* 1/2011 Shin .................. H04B 7/024
455/452.1

(Continued)

FOREIGN PATENT DOCUMENTS

| KR | 10-2010-0091585 | 8/2010 |
| WO | 2010/105549 | 9/2010 |
| WO | 2011/020062 | 2/2011 |

OTHER PUBLICATIONS

PCT International Application No. PCT/KR2012/005414, Written Opinion of the International Searching Authority dated Jan. 24, 2013, 17 pages.

*Primary Examiner* — Ayaz Sheikh
*Assistant Examiner* — Mariela Vidal Carpio
(74) *Attorney, Agent, or Firm* — Lee Hong Degerman Kang & Waimey; Jonathan Kang; Jeffrey Lotspeich

(57) ABSTRACT

The present invention relates to a method for determining a precoding matrix for downlink signal transmission in a base station cooperative wireless communication system. The method includes receiving from a first terminal first channel information between the first base station and the first terminal, and second channel information between a second base station and the first terminal, transferring the first and the second channel informations to the second base station, determining a first precoding matrix for a first channel maximizing the efficiency of transmission to the first terminal, and determining, by the second base station, a second precoding matrix for a third channel between the second base station and the first terminal in order for a signal transmitted from the second base station to the first terminal to be arranged in an area where a signal transmitted from the first base station to the first terminal is not used.

6 Claims, 8 Drawing Sheets

(51) Int. Cl.
*H04L 25/03* (2006.01)
*H04L 5/00* (2006.01)
*H04B 7/02* (2006.01)
*H04B 7/06* (2006.01)

(56) References Cited

U.S. PATENT DOCUMENTS

| | | | |
|---|---|---|---|
| 2011/0028156 A1* | 2/2011 | Zhu | H04B 7/024 455/450 |
| 2011/0206154 A1 | 8/2011 | Ding et al. | |
| 2012/0246190 A1* | 9/2012 | Surtani | G06F 17/30575 707/769 |
| 2012/0269077 A1* | 10/2012 | Bazzi | H04L 25/03343 370/252 |
| 2013/0096906 A1* | 4/2013 | Niemeyer | G06F 9/455 703/23 |
| 2013/0315189 A1* | 11/2013 | Kim | H04L 1/0026 370/329 |

* cited by examiner (a) control plane protocol stack (b) user plane protocol stack

METHOD FOR TRANSMITTING A DOWNLINK SIGNAL IN A BASE STATION COOPERATIVE WIRELESS COMMUNICATION SYSTEM AND AN APPARATUS FOR SAME

CROSS-REFERENCE TO RELATED APPLICATIONS

This application is the National Stage filing under 35 U.S.C. 371 of International Application No. PCT/KR2012/005414, filed on Jul. 9, 2012, which claims the benefit of U.S. Provisional Application Ser. Nos. 61/547,740, filed on Oct. 16, 2011, the contents of which are all hereby incorporated by reference herein in their entirety.

TECHNICAL FIELD

The present invention relates to a wireless communication system, and more particularly, to a method of transmitting a downlink signal in a base station cooperative wireless communication system and an apparatus therefor.

BACKGROUND ART

3GPP LTE ($3^{rd}$ partnership project long term evolution) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, the present invention intends to propose a method of transmitting a DL signal in a base station cooperative wireless communication system and an apparatus therefor.

Technical Solution

To achieve these and other advantages and in accordance with the purpose of the present invention, as embodied and broadly described, according to one embodiment, a method of determining a precoding matrix for downlink signal transmission in a base station cooperative wireless communication system includes the steps of receiving information on a first channel between a first base station and a first user equipment and information on a second channel between a second base station and the first user equipment, which are received by the first base station from the first user equipment, transmitting the information on the first channel and the information on the second channel to the second base station, which are delivered by the first base station, determining a first precoding matrix for the first channel in order for the first base station to maximize transfer efficiency to the first user equipment, and determining a second precoding matrix for a third channel between the second base station and the first user equipment using the information on the first channel and the information on the second channel in order for the second base station to align a signal transmitted to the first user equipment by the second base station with an area not used by a signal transmitted to the first user equipment by the first base station.

Preferably, the method further includes the step of determining a third precoding matrix for a fourth channel between the second base station and the second user equipment using the first precoding matrix and the second precoding matrix.

In this case, the third precoding matrix can be determined to make transfer efficiency to the second user equipment from the second base station to be maximized.

Or, the third precoding matrix can be determined to make interference to the first user equipment to be minimized. In this case, the third precoding matrix is determined to make a signal transmitted to the second user equipment by the second base station to be aligned with an area not used by a signal transmitted to the first user equipment by the second base station.

More preferably, the first and the second base station support one-way communication only, which is performed from the first base station to the second base station.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, according to embodiment of the present invention, a base station can efficiently transmit a downlink signal in a base station cooperative wireless communication system.

More specifically, according to the embodiment of the present invention, it is able to efficiently perform a base station cooperative communication scheme, i.e., a CoMP transmission (coordinated multipoint transmission) scheme in an environment where capacity of a backhaul link, which connects base stations each other, is limitative and characteristic of high latency exists. In particular, an amount of information delivered between base stations can be efficiently reduced in a manner that information delivery between base stations is limited to one-way and the amount of information delivered between base stations is partially limited according to a state of the backhaul link.

And, transfer efficiency can be enhanced by achieving reinforcement of a signal in a manner that the signal is arranged to be received in an identical space in a receiving end for a partial data stream commonly usable via one-way information delivery. Moreover, in case of a data stream in which a cooperative transmission is not performed, interference is minimized and total information transfer efficiency can be improved in a manner of transmitting the data stream to a space where cooperatively transmitted data streams do not use or less use to make the data stream to be arranged in the space.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
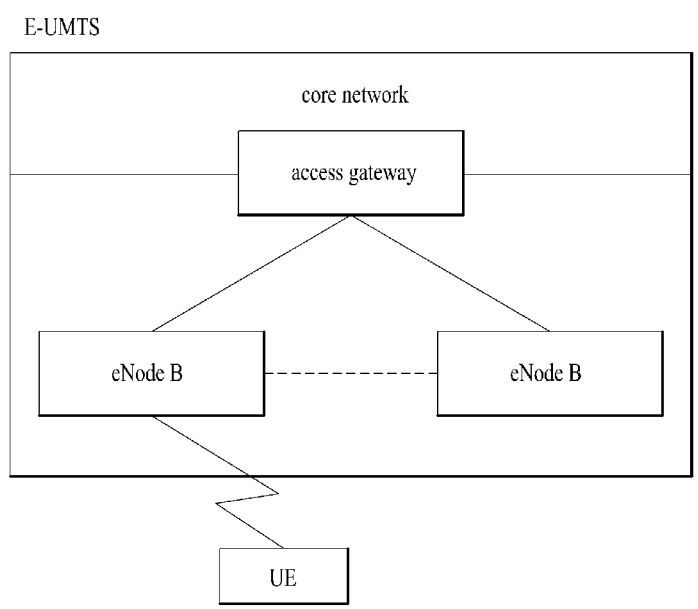
FIG. 1 is a schematic diagram of E-UMTS network structure as one example of a wireless communication system.
Figure 2:
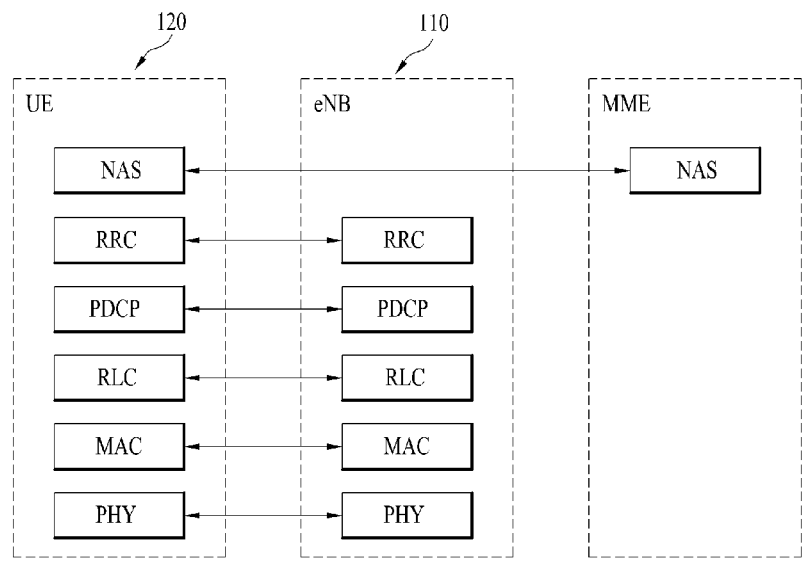
FIG. 2 is a diagram for structures of control and user planes of radio interface protocol between a 3GPP radio access network standard-based user equipment and E-UTRAN.
Figure 2:
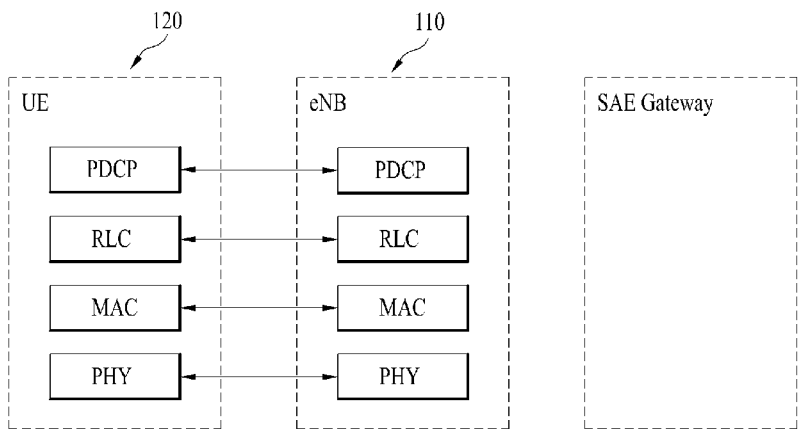

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. If there is an RRC connection between the RRC layer of the user equipment and the RRC layer of the network, the user equipment is in an RRC connected mode. Otherwise, the user equipment is in an RRC idle mode. An NAS (Non-Access Stratum) layer situated at the above of an RRC layer performs such a function as session management, mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
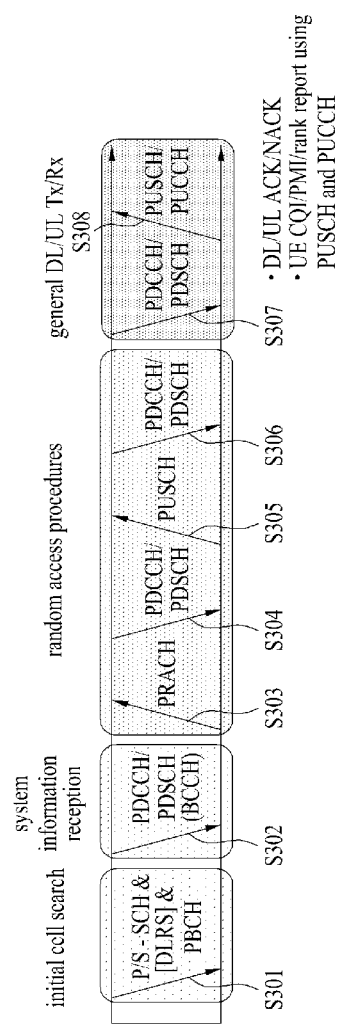
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303] and [S305] and may be then able to receive a response message on PDCCH and the corresponding PDSCH in response to the preamble [S304] and [S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI includes such control information as information on a resource allocated to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

In the following description, MIMO system is explained. MIMO (multiple-input multiple output) technology uses multiple transmitting (Tx) antennas and multiple receiving (Rx) antennas. By using MIMO, data transmission rate and data reception rate can be enhanced. In particular, by using a plurality of antennas at a transmitting end or a receiving end in a radio communication system, it may increase a capacity and enhance performance. In the following description, MIMO may also be called a 'multi antenna'.

The multi antenna technology may not depend on a single antenna path to receive a whole message. Instead, data is completed in a manner of combining data fragments received from many antennas in one place in the multi antenna technology. Hence, when the multi antenna technology is used, a data transmission speed may be enhanced in a cell area of a specific size or system coverage may be enlarged while a specific data transmission speed is secured. And, the multi antenna technology can be widely used for a mobile communication terminal, a relay node, and the like. According to the multi antenna technology, the technology may overcome traffic limit of a mobile communication of a related art using a single antenna.

Figure 4:
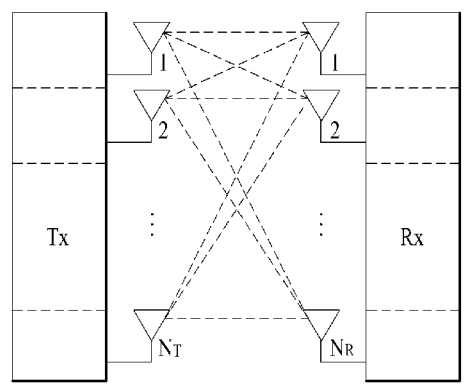
FIG. 4 is a diagram for a multi-antenna communication system.

FIG. 4 is a diagram for a multi-antenna communication system described in the present invention. Referring to FIG. 4, $N_T$ number of transmitting antenna is installed in a transmitting end and $N_R$ number of receiving antenna is installed in a receiving end simultaneously. In case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antennas. Thus, a transfer rate is enhanced and frequency efficiency is enhanced. If a maximum transfer rate is represented as ($R_o$) in case of using a single antenna, the transfer rate according to the increase of the channel transmission capacity can be theoretically increased as much as the maximum transfer rate ($R_o$) multiplied by a rate of increase $R_i$. In this case, the $R_i$ is a smaller value among the $N_T$ and the $N_R$.

$$R_i = \min(N_T, N_R) \quad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

Figure 7:
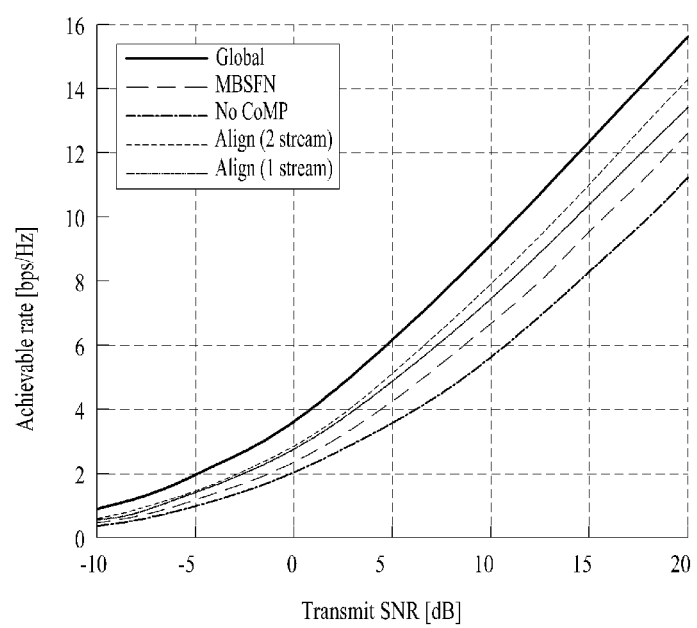
FIG. 7 is a diagram for comparing performance of a CoMP scheme of the present invention with performance of a legacy CoMP scheme.

A communication method in the multi-antenna system is explained in more detail using a mathematical modeling. As depicted in FIG. 7, assume that there exist $N_T$ number of transmitting antenna and $N_R$ number of receiving antenna in the system. First of all, if we look into a transmission signal, in case that there exists $N_T$ number of transmitting antennas, the maximum number of information capable of being transmitted corresponds to $N_T$. Transmission information can be represented as a vector in the following.

$$s=[s_1, s_2, \ldots, s_{N_T}]^T \qquad \text{[Formula 2]}$$

Meanwhile, for each of the transmission informations $s_1, s_2, \ldots, s_{N_T}$, a transmit power may vary according to the each of the transmission informations. In this case, if each of the transmit powers is represented as $P_1, P_2, \ldots, P_{N_T}$, transmit power-adjusted transmission information can be represented as a vector in the following.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \qquad \text{[Formula 3]}$$

And, if $\hat{s}$ is represented using a diagonal matrix P, it can be represented as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix W plays a role in distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called a weighted matrix or a precoding matrix.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Formula 5]}$$

In general, a physical meaning of a rank of a channel matrix may correspond to the maximum number capable of transmitting informations different from each other in a given channel. Since the rank of the channel matrix is defined by a minimum number of the number of rows or columns independent from each other, the rank of the matrix is configured not to be greater than the number of the rows or the columns. For instance, the rank of a channel matrix H (rank (H)) is limited as shown in Formula 6.

$$\text{rank}(H) \leq \min(N_T, N_R) \qquad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \qquad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the type of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, CoMP (coordinated multipoint transmission) schemes have been proposed as a method of transmitting information via cooperation between base stations. As a representative scheme of the CoMP schemes, there exist a global precoding scheme and an MBSFN (multicast broadcast single frequency network) precoding scheme that a plurality of base stations simultaneously transmit information to a single user.

The global precoding scheme is designed based on a composite channel of channels coming to a terminal of a user from a plurality of the base stations. When a CoMP consists of cooperation of two base stations, each of which has M number of antennas, if a signal is transmitted to a UE1 including N antenna from a BS1 and a BS2 on a composite channel H=[$H_{11}$ H21] (N×2M), the composite channel can be represented via SVD (singular value decomposition) in the following.

$$H=UDV^H=UD[v_{(1)} \ldots v_{(M)}]^H \qquad \text{[Formula 8]}$$

In Formula 8, U (N×N) and V (2M×2M) means a left singular matrix of the composite channel H and a right singular matrix of the composite channel H, respectively. $V_{(i)}$ means $i^{th}$ column vector of a V matrix. $A^H$ means Hermitian transpose of a matrix A. If two base stations transmit L (L≤rank(H)) number of streams to the UE1, an optimal precoding matrix determining a direction of beam is determined as $W_{GLOBAL}=[v_{(1)} \ldots v_{(L)}]$. And, a matrix $P_{GLOBAL}=\text{diag}(p_1 \ldots p_L)$, which allocates transmit power to the L number of streams, is designed to make transfer efficiency to be maximized as depicted in Formula 9 in the following.

$$P_{GLOBAL}=\text{max. } \log(1+(UDPD^H U^H)/N_0) \qquad \text{[Formula 9]}$$

Consequently, transmit power per each stream is determined by a WF (water-filling) allocation method for a case that maximum transmit power is limited in every base station.

In this case, the WF (water-filling) allocation method is briefly explained. In an assumption that a transmitting end is aware of channel information, a channel response of a signal which is transmitted when a channel frequency response is not ideal has channel gains different from each other in frequency domain. This means that frequency reduction of a channel is not equally distributed in frequency domain. In case of a channel where a very severe null exists in a frequency response or a strong narrowband noise exists, it is hard to transmit a signal of this sort of frequency on the channel. Hence, in order to approach capacity of the channel, a spectrum shaping should be applied to the transmitted signal. Hence, channel output and transmitting end information should be distributed in frequency domain in a form of being allocated to maximum capacity. This is a basic concept of the WF (water-filling) allocation method.

Back to the present invention, an optimal global precoding matrix, which is designed in the BS1 and the BS2 by a matrix for finally determining a beam direction and a matrix for determining power allocation, can be represented as Formula 10 in the following.

$$F_{1,GLOBAL} = W_{GLOBAL}^{(1)} P_{GLOBAL},$$

$$F_{2,GLOBAL} = W_{GLOBAL}^{(2)} P_{GLOBAL} \quad \text{[Formula 10]}$$

In this case, it satisfies $W=[W^{(1)}\ W^{(2)}]^T$. $W^{(1)}$ and $W^{(2)}$ mean a matrix consisting of upper M number of row vectors of a matrix W and a matrix consisting of lower M number of row vectors of the matrix W, respectively.

The MBSFN precoding scheme is designed based on an effective channel coming to a user from all base stations and all base stations use a common precoding matrix. If the effective channel corresponds to $H_{eff}=H_{11}+H_{21}$ (N×M), a channel can be represented as Formula 11 in the following via singular value decomposition.

$$H = U_{eff} D_{eff} V_{eff}^H = U_{eff} D_{eff} [v_{eff,(1)} \ldots v_{eff,(M)}]^H \quad \text{[Formula 11]}$$

The common precoding matrix used in a base station is determined by a precoding matrix $W_{MBSFN}=[v_{eff,(1)} \ldots v_{eff,(L)}]$ and a transmit power allocation matrix is designed as Formula 12 in the following.

$$P_{MBSFN} = \max.\ \log(I + (U_{eff} D_{eff} P D_{eff}^H U_{eff}^H)/N_0) \quad \text{[Formula 12]}$$

Consequently, the common precoding matrix designed in the BS1 and the BS2 can be represented as Formula 13 in the following.

$$F_{1,MBSFN} = F_{2,MBSFN} = W_{MBSFN} P_{MBSFN} \quad \text{[Formula 13]}$$

A legacy CoMP scheme has a drawback in that there is too much information delivered via a backhaul link between base stations to perform a cooperative transmission. In case of X2 interface considered as a backhaul link in an actual standard, the interface has a limit of transmission capacity and high latency characteristic. Hence, a scheme of designing a precoding, which is designed after all informations necessary for cooperation are delivered to all base stations participating in the cooperation without considering an impact of the backhaul link, is not suitable for an actual system having a limitation of backhaul link capacity and delay.

Hence, it is necessary to design a scheme of precoding capable of efficiently operating in an environment where an amount of information delivered is limitative. And, if a precoding is performed based on a composite channel consisting of channels of all base stations, there exist a drawback that a size of a codebook used for representing a precoding matrix becomes large. The drawback becomes more severe in terms of a limitative feedback as the number of base stations participating in the cooperation increases.

The present invention proposes a scheme of improving transmission capacity of a user via a limitative cooperation in an environment where an asymmetrical information exchange is available only. Due to capacity limitation of a connection link (backhaul link) between base stations and the like, a part of information between base stations is delivered to a neighboring base station in one-way. Consequently, an amount of information available in each base station is asymmetrically provided. A base station of a small amount of information makes transfer efficiency to be maximized in a manner of utilizing channel information of the base station within limitative information. On the contrary, A base station of a relatively large amount of information increases the transfer efficiency by strengthening a signal received by a terminal in a manner of aligning a signal transmitted by the base station with a signal transmitted by a counterpart base station. And, the base station of the relatively large amount of information increases the transfer efficiency in a manner of putting an interference signal, which occurs when the base station simultaneously services a different terminal, in a space not used or less used by the counterpart base station.

Figure 5:
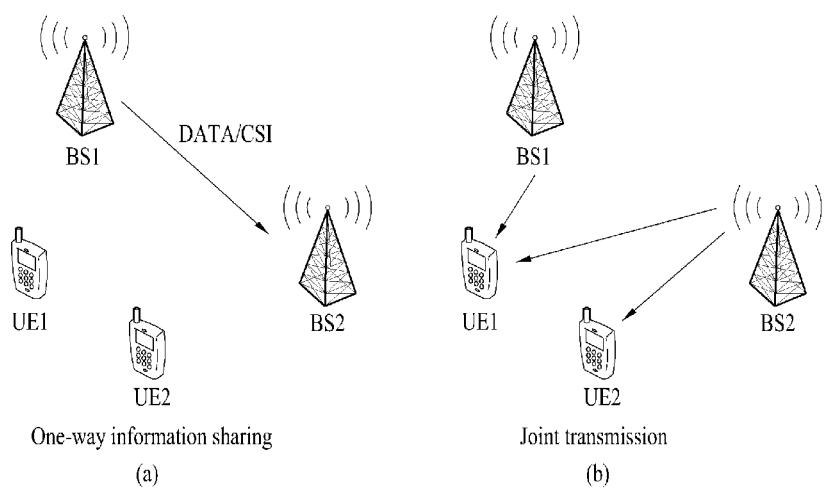
FIG. 5 is a diagram for CoMP environment performing a cooperative transmission by transmitting information in one-way.

More specifically, the present invention proposes a CoMP environment where information is delivered in one-way to perform a cooperative transmission as depicted in FIG. 5. A base station 1 (BS1) delivers a part of data stream of a user 1 (UE1) and CSI (channels state information) to a base station 2 (BS2) via a backhaul link. Although the present invention assumes one-way CoMP scheme for a case with which two base stations cooperate, the proposed scheme can also extensively apply to an environment in which more base stations are participating. Assume an environment that all base stations and UEs are equipped with multi antenna.

The CSI delivered from the base station 1 (BS1) to the base station 2 (BS2) includes information on a channel $H_{11}$ and a channel $H_{21}$ connected by the base stations and the user 1 (UE1). The BS1 designs a precoding matrix using the data stream information and the CSI information of the UE1, which is originally owned by the BS1, to maximize transfer efficiency of the information of the UE1 irrespective of an operation of the BS2 and then allocates transmit power. The BS2 designs a precoding using the channel information on the channel $H_{11}$ and the channel $H_{21}$ delivered from the BS1 to make signal strength to be reinforced in a manner of aligning the data stream of the UE1 with a receiving end and then allocate transmit power. And, the BS2 improves transfer efficiency by designing a precoding for making a signal of the UE2 to be arranged in a space not used or less used by the UE1.

Specifically, the present invention works in the following sequences.

1) Information Delivery Via a Backhaul Link

The BS1 delivers $s_1^{(1)}$, which is a part of data stream $s_1$ for the UE1, and information on the channel $H_{11}$ and $H_{21}$ connected with the UE1 to the BS2 via a backhaul link. In this case, an amount of the delivered information $s_1^{(1)}$ is determined in accordance with capacity of the backhaul link and permissible amount of latency. And, a backhaul link signal indicating information on a stream used for a cooperative transmission and information on an independently transmitted stream is delivered to the BS2. Information on a channel of the UE1 is obtained via feedback of the UE1 or can be directly estimated by base stations via reciprocity of the channel. And, information on the channel $H_{22}$ and $H_{12}$ of the UE2 can be obtained by a same manner and the information can be obtained by the BS2 only.

2) Precoding Matrix Design of BS1

The BS1 designs a precoding matrix using available limitative information to make transfer efficiency of the UE1 to be maximized. In this case, since the BS1 does not have information on a channel and data of the UE2, the BS1 does not consider an operation of the BS2. Hence, if it is assumed that the number of streams transmitted in the BS1 correspond to $L(L \leq \text{rank}(H_{11}))$, an optimal precoding matrix is determined as $W_{11}=[v_{11,(1)} \ldots v_{11,(L)}]$. In this case, $v_{11,(i)}$ means $i^{th}$ column vector of a right singular matrix $V_{11}$ of a channel $H_{11}=U_{11}D_{11}V_{11}^H$. And, a matrix $P_{11}=\text{diag}(p_{11,1} \ldots p_{11,L})$, which allocates transmit power to L number of streams, is designed to make transfer efficiency of the UE1 to be maximized as depicted in Formula 14 in the following.

$$P_{11} = \text{argmax. } \log(I + (U_{11}D_{11}P_{11}D_{11}{}^H U_{11}{}^H)/N_0) \quad \text{[Formula 14]}$$

This is calculated according to the WF allocation method and a final precoding matrix in the BS1 is determined as Formula 15 in the following.

$$F_{11} = W_{11}P_{11} \quad \text{[Formula 15]}$$

3) Precoding Matrix Design of BS2

(1) First of all, the BS2 designs a precoding matrix $F_{21}$ to perform cooperative transmission with the UE1 via a partial CoMP scheme.

Specifically, the BS2 can calculate a precoding matrix $F_{11}$ designed by the BS1 based on available channel information on the $H_{11}$ and $H_{21}$. Based on this, an $s_1^{(1)}$ signal, which is transmitted from the BS2 to the UE1 on the channel $H_{21}$, is aligned with an $s_1^{(1)} (\subset s_1)$ signal, which is transmitted from the BS1 to the UE1 on the channel $H_{11}$. If it is assumed that the number of cooperatively transmitted streams $s_1^{(1)}$ correspond to K (K≤L), arrangement of a signal can be obtained by such a method as Formula 16 in the following.

$$W_{21}' = (H_{21}{}^H H_{21})^{-1} H_{21}{}^H U_{11}{}^{(1)} \quad \text{[Formula 16]}$$

In Formula 16, $U_{11}{}^{(1)}$ is a matrix consisting of column vectors corresponding to $s_1^{(1)}$ in a left singular matrix $U_{11}$ of the channel $H_{11} = U_{11}D_{11}V_{11}{}^H$. A signal alignment matrix designed by the aforementioned method is converted to a matrix including a unit norm via normalization as shown in Formula 17 in the following.

$$W_{21} = W_{21}'S_{21} \quad \text{[Formula 17]}$$

In this case, a matrix $S_{21} = \text{diag}(1/\|[1w_{21,(1)}'\| \ldots 1/\|w_{21,(K)}'\|)$ plays a role of converting a column of the signal alignment matrix $W_{21}'$ to a unit norm. A transmit power allocation matrix is designed like Formula 18 in the following to allocate optimal transmit power to the aforementioned arranged signal.

$$P_{21} = \text{argmax. } \log(I + (U_{11}D_{11}P_{11}D_{11}{}^H U_{11}{}^H + U_{11}{}^{(1)} S_{21}P_{21}S_{21}{}^H U_{11}{}^{(1)H})/N_0) = \text{argmax. } \log(I + (U_{11}{}^{(1)} S_{21}P_{21}S_{21}{}^H U_{11}{}^{(1)H})/N_0) \quad \text{[Formula 18]}$$

The transmit power allocation matrix is obtained via the WF allocation method allocated to a normalized matrix $S_{21}$. Hence, a finally obtained precoding matrix $F_{21}$ is given like Formula 19 in the following.

$$F_{21} = W_{21}P_{21} \quad \text{[Formula 19]}$$

(2) Finally, a precoding $F_{22}$ is designed to transmit information of the UE2 in the BS2. Two methods are available for designing the $F_{22}$. First of all, the $F_{22}$ can be designed to make transfer efficiency of the information on the UE2 to be maximized based on the previously designed $F_{11}$ and the $F_{21}$. Secondly, there is a method of transmitting the information of the UE2 to make interference delivered to the UE1 to be minimized in a manner of aligning the information of the UE2 with a space not used or less used by the UE1 based on the previously designed $F_{11}$ and the $F_{21}$. This method is explained in more detail with reference to the attached drawing.

Figure 6:
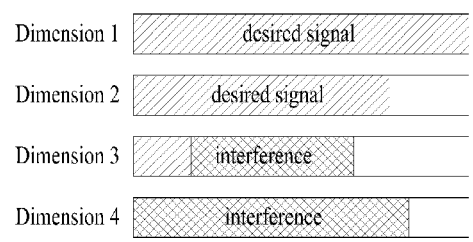
FIG. 6 is a diagram for explaining a method of designing a precoding matrix to transmit information of a user 2 in a base station 2 according to embodiment of the present invention.

FIG. 6 is a diagram for explaining a method of designing a precoding matrix to transmit information of a user 2 in a base station 2 according to embodiment of the present invention.

Referring to FIG. 6, there exist 4 channel spaces (dimension 1 to dimension 4) between the BS1 and the UE1. If the BS1 performs WF power allocation according to a given channel gain, most of information may be delivered to 2 spaces (dimension 1 and 2).

In this case, it is able to make interference occurring due to information of the UE2 to be arranged in a space less used by the UE1 by designing of $F_{22}$. In this case, interference arrangement scheme can be performed as depicted in Formula 20 in the following similar to the aforementioned signal alignment scheme.

$$W_{22}' = (H_{21}{}^H H_{21})^{-1} H_{21}{}^H U_{11}{}^{(0)} \quad \text{[Formula 20]}$$

In this case, $U_{11}{}^{(0)}$ is a matrix consisting of column vectors corresponding to a less used space in a left singular matrix $U_{11}$ of a channel $H_{11} = U_{11}D_{11}V_{11}{}^H$. Hence, it is able to finally design the $F_{22} = W_{22}P_{22}$ in a manner of allocating power $P_{22}$ to make an amount of information of the UE2 to be maximized in an environment which is designed to make the interference to be arranged. Consequently, if the BS2 transmits information using the interference arrangement scheme, the interference is arranged in the space less used by the UE1, and a space to which most of the information is transmitted may obtain high transfer efficiency without any interference.

A main agent of designing a precoding matrix of the BS2 can be considered by two schemes. First of all, the BS2 is able to directly design precoding matrix $F_{21}$ and $F_{22}$ using channel information estimated by the BS2 and channel information delivered from the BS1. Secondly, instead of transmitting the channel information to the BS2 via a backhaul link, the BS1 can design the precoding matrix itself of the BS2 and deliver the precoding matrix to the BS2.

Designing the precoding matrix itself of the BS2 performed by the BS1 is explained in the following. The BS1 designs a backhaul link signal for indicating information on a cooperatively transmitted stream and a precoding matrix $F_{21}$ corresponding to the backhaul link signal and delivers the signal and the matrix $F_{21}$ to the BS2. And, the BS1 designs a precoding matrix $F_{22}$ to make interference for a signal in which cooperative transmission is not available to be minimized in the UE1 and delivers the matrix $F_{22}$ to the BS2. In this case, designing the precoding matrix $F_{22}$ by the BS1 may have a meaning that the BS1 directly designates the $F_{22}$ to be used by the BS2. More comprehensively, it may include a meaning that the BS1 designates an attribute of the $F_{22}$ to be used by the BS2.

As an example of the attribute designation, the BS1 may inform the BS2 of a set of a series of precoding matrixes capable of being used as the $F_{22}$. Or, the BS1 may inform the BS2 of a set of a series of precoding matrixes incapable (i.e., strongly interfered in case of using in the BS2) of being used as the $F_{22}$. By doing so, in terms of the BS2, the precoding matrix of the BS2 is configured in a manner that joint transmission (JT) based cooperative transmission is performed for a part of a stream and interference avoidance transmission form is performed for the remaining stream.

FIG. 7 is a diagram for comparing performance of a CoMP scheme of the present invention with performance of a legacy CoMP scheme. In particular, in FIG. 7, it is assumed that all BSs and the UE1 are equipped with 2 antennas, respectively. And, the UE 2 is not considered to see performance of the CoMP scheme only. And, FIG. 7 compares a non-CoMP scheme for transmitting information in the BS1 only without performing base station cooperative communication using the global precoding scheme, the MBSFN precoding scheme or CoMP with the proposed signal alignment scheme. The signal alignment scheme according to the present invention considers a case that all of two streams are cooperatively transmitted and a case that one of the two streams is cooperatively transmitted.

Referring to FIG. 7, the proposed scheme is superior to the MBSFN scheme including an identical codebook size in performance and is inferior to the global precoding scheme in performance. Yet, in order to perform the global precoding scheme, all data streams and channel informations should be shared by all base stations and there is a drawback in that the codebook size is big.

The present invention is applicable to a cooperative communication environment between base stations where capacity of a backhaul link, which is considered in an actual standard, is limitative and characteristic of high latency exists. By using the proposed scheme, a cooperative communication can be performed between base stations in an information imbalance state corresponding to a state that all data streams are not equally delivered to all base stations. And, the proposed scheme is also applicable to an environment in which a cooperative communication is performed using a relay where information imbalance naturally occurs between nodes, a femto cell including a hierarchical structure between base stations, and the like with a similar scheme.

Figure 8:
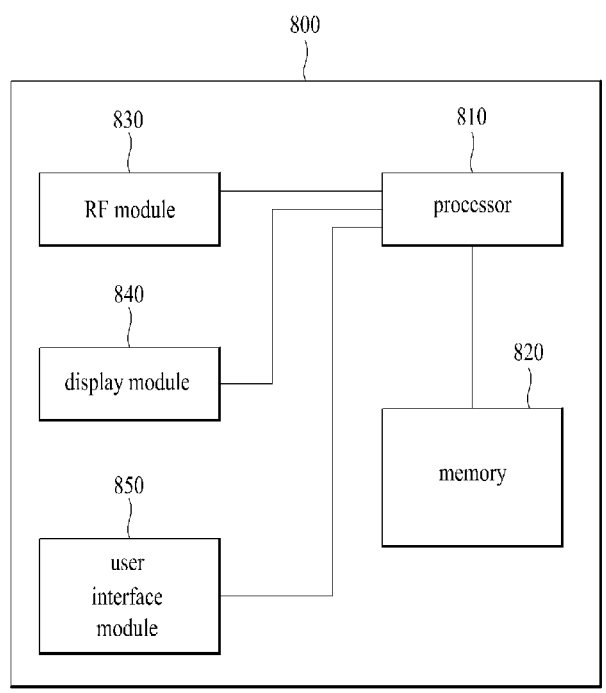
FIG. 8 is an example for a block diagram of a communication device according to one embodiment of the present invention.

FIG. 8 is an example for a block diagram of a communication device according to one embodiment of the present invention.

Referring to FIG. 8, a communication device 800 may include a processor 810, a memory 820, an RF module 830, a display module 840, and a user interface module 850.

Since the communication device 800 is depicted for clarity of description, prescribed module(s) may be omitted in part. The communication device 800 may further include necessary module(s). And, a prescribed module of the communication device 800 may be divided into subdivided modules. A processor 810 is configured to perform an operation according to the embodiments of the present invention illustrated with reference to drawings. In particular, the detailed operation of the processor 810 may refer to the former contents described with reference to FIG. 1 to FIG. 8.

The memory 820 is connected with the processor 810 and stores an operating system, applications, program codes, data, and the like. The RF module 830 is connected with the processor 810 and then performs a function of converting a baseband signal to a radio signal or a function of converting a radio signal to a baseband signal. To this end, the RF module 830 performs an analog conversion, amplification, a filtering, and a frequency up conversion, or performs processes inverse to the former processes. The display module 840 is connected with the processor 810 and displays various kinds of informations. And, the display unit 840 can be implemented using such a well-known component as an LCD (liquid crystal display), an LED (light emitting diode), an OLED (organic light emitting diode) display and the like, by which the present invention may be non-limited. The user interface module 850 is connected with the processor 810 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting a downlink signal in a base station cooperative wireless communication system and apparatus therefor are described with reference to examples applied to 3GPP LTE system, it may be applicable to various kinds of wireless communication systems as well as to the 3GPP LTE system.

What is claimed is:

1. A method of determining a precoding matrix for downlink signal transmission in a base station cooperative wireless communication system, comprising:

receiving, by a first base station from a first user equipment, a first channel information on a first channel between the first base station and the first user equipment and a second channel information on a second channel between a second base station and the first user equipment;

transmitting, by the first base station, at least part of the first channel information and the second channel information to the second base station via a backhaul link between the first base station and the second base station, wherein an amount of the at least part of the first channel information is determined in accordance with capacity of the backhaul link and permissible amount of latency;

determining, by the first base station, a first precoding matrix for the first channel to maximize transfer efficiency of a first signal for the first user equipment; and determining, by the second base station, a second precoding matrix for the second channel using the first channel information and the second channel information to align a second signal, transmitted to the first user equipment by the second base station, with an area not used by the first signal, wherein transmit power for the second signal is allocated by using water-filling allocation on a normalized signal alignment matrix via normalization.

2. The method of claim 1, further comprising determining a third precoding matrix for a third channel between the second base station and a second user equipment using the first precoding matrix and the second precoding matrix.

3. The method of claim 2, wherein the third precoding matrix is determined to make transfer efficiency of a third signal, to the second user equipment from the second base station to be maximized.

4. The method of claim 2, wherein the third precoding matrix is determined to make interference to the first user equipment to be minimized.

5. The method of claim 4, wherein the third precoding matrix is determined to make a third signal, transmitted to the second user equipment by the second base station to be aligned with an area not used by the second signal.

6. The method of claim 1, wherein the first and the second base stations support one-way communication only, which is performed from the first base station to the second base station.

* * * * *